United States Patent
Kim

(10) Patent No.: US 7,245,911 B2
(45) Date of Patent: Jul. 17, 2007

(54) MOBILE TERMINAL FOR AUTOMATICALLY MANAGING COUNTRY CODE AND METHOD FOR STORING/FINDING PHONE NUMBER USING THE SAME

(75) Inventor: Yong-Hyon Kim, Kimpo-shi (KR)

(73) Assignee: Samsung Electronics Co., Ltd. (KR)

( * ) Notice: Subject to any disclaimer, the term of this patent is extended or adjusted under 35 U.S.C. 154(b) by 534 days.

(21) Appl. No.: 10/760,907

(22) Filed: Jan. 20, 2004

(65) Prior Publication Data

US 2004/0147260 A1    Jul. 29, 2004

(30) Foreign Application Priority Data

Jan. 22, 2003    (KR) .................... 10-2003-0004307

(51) Int. Cl.
*H04Q 7/20* (2006.01)
*H04Q 7/32* (2006.01)
*H04Q 7/38* (2006.01)

(52) U.S. Cl. ............... 455/432.1; 455/432.2; 455/432.3; 455/550.1; 455/564; 455/422.1; 455/412.1; 455/414.1

(58) Field of Classification Search ............ 455/432.1, 455/432.2, 432.3, 550.1, 551, 552.1, 564, 455/565, 412.1, 412.2, 403, 422.1, 426.1, 455/426.2, 414.1, 414.3, 414.2, 456.1, 456.6, 455/457, 500, 517, 565
See application file for complete search history.

(56) References Cited

U.S. PATENT DOCUMENTS 5,305,372 A * 4/1994 Tomiyori ................. 455/564
2004/0204117 A1* 10/2004 Weiner .................... 455/564
2005/0101323 A1* 5/2005 De Beer ................ 455/435.2

FOREIGN PATENT DOCUMENTS

DE    197 11 096 A1    3/1997
EP    0 526 832    7/1992
WO    WO 00/41422    7/2000

* cited by examiner

*Primary Examiner*—Keith Ferguson
(74) *Attorney, Agent, or Firm*—The Farrell Law Firm

(57) ABSTRACT

A mobile terminal for providing a mobile service and a method for storing and finding a phone number using the mobile terminal. The mobile terminal stores and manages country code information, a mobile service subscriber's registration information, and mobile service usage history information; automatically generates a country code of a country where the mobile terminal is located using the mobile service subscriber's registration information and mobile service usage history information; and executes a phone number storage command or a phone number search command using the country code. Where an international roaming service is executed by a user's moving from one country to another country, the mobile terminal can automatically generate a country code or store an arbitrary phone number. Thus, there is no need for mobile service users to manually enter a country code in their mobile terminal when roaming service is executed.

6 Claims, 7 Drawing Sheets

| MCC | MNC | LAI | PLMN ENTERPRISER ID | COUNTRY CODE |
|---|---|---|---|---|
| 25 | f5 | 30 | PLMN A | 0033 |
| 25 | f5 | 31 | PLMN B | 0033 |
| 25 | f5 | 32 | PLMN C | 0033 |
| 44 | f5 | 30 | PLMN D | 0044 |
| 44 | f5 | 31 | PLMN E | 0044 |

FIG.3

| NAME | COUNTRY CODE | PHONE NUMBER |
|------|--------------|--------------|
| AAA  | 0044         | 01234567     |
| BBB  | 0033         | 05764781     |
| ⋮    | ⋮            | ⋮            |

FIG.4

MOBILE TERMINAL FOR AUTOMATICALLY MANAGING COUNTRY CODE AND METHOD FOR STORING/FINDING PHONE NUMBER USING THE SAME

PRIORITY

This application claims priority to an application entitled "WIRELESS TERMINAL FOR AUTO-MANAGING NATIONAL CODE AND METHOD FOR STORING AND SEARCHING PHONE NUMBER USING THE WIRELESS-TERMINAL" filed in the Korean Intellectual Property Office on Jan. 22, 2003 and assigned Serial No. 2003-04307, the contents of which are hereby incorporated by reference.

BACKGROUND OF THE INVENTION

1. Field of the Invention

The present invention relates to a mobile terminal, also called a wireless terminal, and more particularly to a mobile terminal for automatically managing a country code during roaming, and a method for storing and finding a phone number using the mobile terminal 2. Description of the Related Art Typically, a GSM (Global System for Mobile communication) is a digital mobile phone system widely used in Europe and other countries in recent times. The GSM is a variant of TDMA (Time Division Multiple Access), and is one of the three most widely used wireless telephony systems: the TDMA system, the CDMA (Code Division Multiple Access) system, and the GSM system. A GSM enables a user who travels abroad to continuously use his or her mobile phone anywhere he or she wishes because many international GSM network enterprisers have entered into roaming agreements with each other.

Conventionally, in the case where a user of a GSM-based mobile service moves from one country to another country and thus a roaming process between such countries is performed, in order to select a phone number previously registered in a mobile terminal and to use the selected phone number to make a phone call to a receiving party, the user must append a corresponding country code to the registered phone number prior to roaming. Also, the user who is roaming from one country to another country must append a country code of an original country to the phone number registered on a PLMN (Public Land Mobile Network) of the original country, in order for the user's phone number as registered on the PLMN to be stored in his or her mobile terminal.

FIG. 1 is an exemplary view illustrating a conceptual diagram wherein an international roaming process occurs on a PLMN service network. Referring to FIG. 1, in the case where a mobile terminal 10 of a subscriber registered in a MSC (Mobile Switching Center) 30 of a PLMN B service having a country code of '0033' roams within a MSC's 20 area of a PLMN A service having a country code of '0044', a user of the mobile terminal 10 must append a country code of '0033" to a prestored phone number to make a phone call to the prestored phone number. Unless the user appends the country code of '0033' to the prestored phone number, there may-occur an erroneous phone call to another party registered to the PLMN A service having the country code of '0044'. For example, in the case where the mobile terminal 10 previously stores a phone number of '123-4567' therein, and a user of the mobile terminal 10 selects only the phone number of 123-4567 without appending an appropriate country code to the phone number of '123-4567', the PLMN A service MSC 20 makes a phone, call to a wrong phone number of '0044-123-4567' instead of a correct phone number of '0033-123-4567'.

Conversely, in the case where the PLMN B service subscriber attempts to store in the mobile terminal 10 a phone number of a user registered to the PLMN A service in an area of the PLMN A service MSC 20, the subscriber must append a country code of '0044' corresponding to the PLMN A service to the user's phone number. Otherwise, the mobile terminal 10 recognizes the user's phone number as a phone number of a subscriber registered to the PLMN B service.

In this manner, conventionally, in the case where a user of such a PLMN service moves from one country to another country and thus there occurs a roaming process between countries, he or she must append an additional country code to his or her phone number in order to make a phone call to a called: party or store any phone number in the mobile terminal, resulting in a user's inconvenience.

SUMMARY OF THE INVENTION

Therefore, the present invention has been made in view of the above problems, and it is an object of the present invention to provide a mobile terminal for storing any phone number in the mobile terminal, and for automatically generating a country code, when a user is roaming internationally by moving from one country to another country, to make a phone call to a called party without appending a country code to the mobile terminal.

It is another object of the present invention to provide a method for storing a phone number which automatically generates a country code upon receiving a phone number storage command.

It is yet another object of the present invention to provide a method for finding a phone number which automatically generates a country code upon receiving a phone number search command.

In accordance with one aspect of the present invention, the above and other objects can be accomplished by the provision of a mobile terminal for providing mobile service subscribers with a mobile service, comprising: a country code storage unit for coupling each mobile communication network ID with a country code of a prescribed country having the mobile communication network, and storing and managing the coupling result of the mobile communication network ID and the country code, wherein the mobile communication network ID is received from each of a plurality of mobile communication network MSCs (Mobile Switching Centers) providing a mobile communication network service for every service area; a subscriber information storage unit for storing and managing mobile service subscriber's registration information and mobile service usage history information; a phone number storage unit for storing and managing phone number information; and a controller for detecting a mobile communication network ID of a current PLMN service and retrieving mobile service usage history information from the subscriber information storage unit upon receiving a phone number storage command or a phone number search command, for determining whether a roaming operation of the mobile terminal is executed on the basis of the mobile communication network ID of the current PLMN service and the mobile service usage history information, and for executing either one of the phone number storage command or the phone number search command using an entry phone number and the detected country code.

In accordance with another aspect of the present invention, there is provided a method for storing a phone number in a mobile terminal adapted to store and manage country code information of various countries, mobile service subscriber's registration information, and mobile service usage history information, comprising the steps of: a) reading an external entry phone number according to a phone number storage command; b) analyzing the phone number read at step (a) to determine whether the phone number has a country code; c) if the phone number has no country code at step (b), retrieving a country code of a country where the mobile terminal is located using a mobile communication network ID of a current PLMN service; and d) storing the phone number read at step (a) and the country code retrieved at step (c) in the mobile terminal.

In accordance with yet another aspect of the present invention, there is provided a method for finding a phone number in a mobile terminal adapted to store and manage country code information of many countries, mobile service subscriber's registration information, and mobile service usage history information, comprising the steps of: a) reading a search-requested phone number from a memory contained in the mobile terminal upon receiving a phone number search command; b) detecting a country code of a country where the mobile terminal is located; c) comparing a country code contained in the phone number read at step (a) with the country code detected at step (b); and d) displaying the phone number read at step (a) in the form of a prescribed display format on the basis of the result of step (c).

BRIEF DESCRIPTION OF THE DRAWINGS

The above and other objects, features and other advantages of the present invention will be more clearly understood from the following detailed description taken in conjunction with the accompanying drawings, in which:

FIG. 3 is a view illustrating an exemplary configuration for storing a country code therein using a country code table in accordance with a preferred embodiment of the present invention;

FIG. 4 is a view illustrating an exemplary configuration for storing/managing a phone number in a phone number storage unit in accordance with a preferred embodiment of the present invention;

DETAILED DESCRIPTION OF THE PREFERRED EMBODIMENTS

Figure 1:
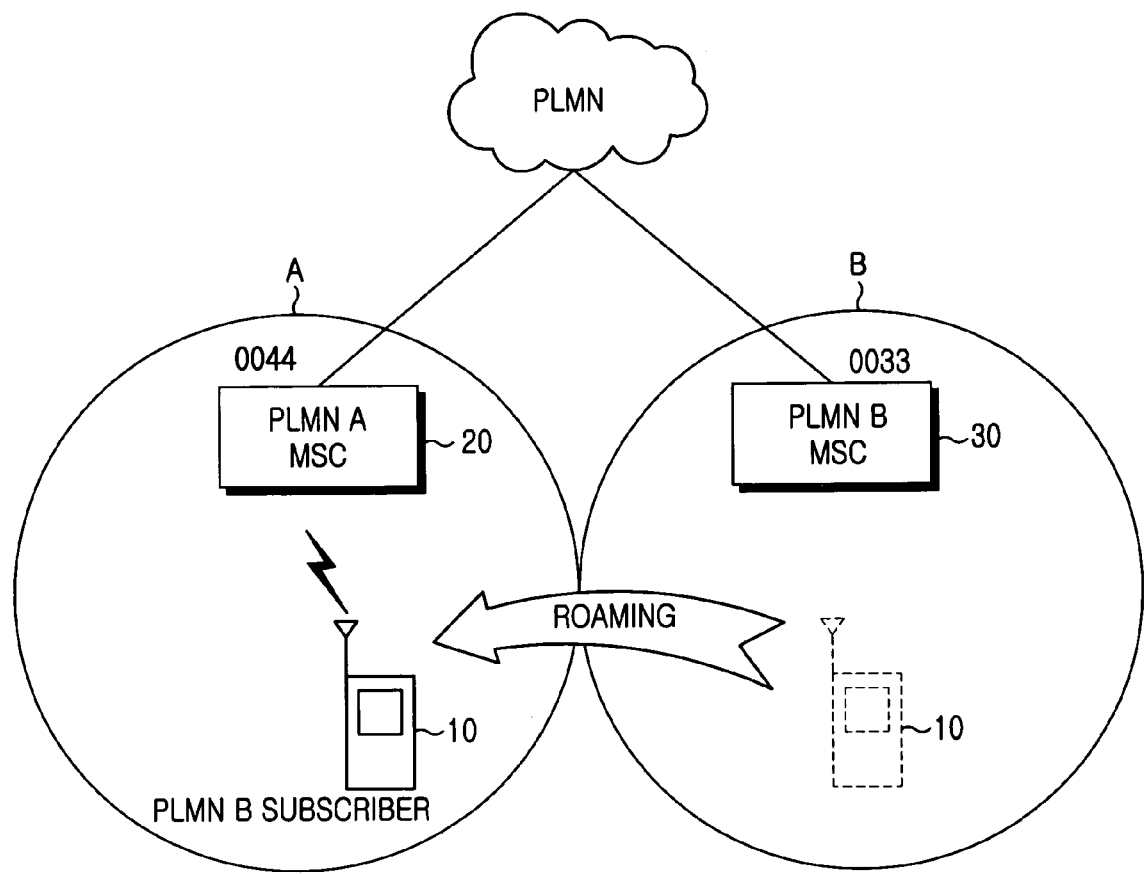
FIG. 1 is an exemplary view illustrating a conceptual diagram wherein the roaming between countries occurs on a PLMN service network.

Preferred embodiments of the present invention will be described in detail with reference to the attached drawings. In the drawings, the same or similar elements are denoted by the same reference numerals even though they are depicted in different drawings. In the following description, a detailed description of known functions and configurations incorporated herein will be omitted when they might make the subject matter of the present invention unclear.

Figure 2:
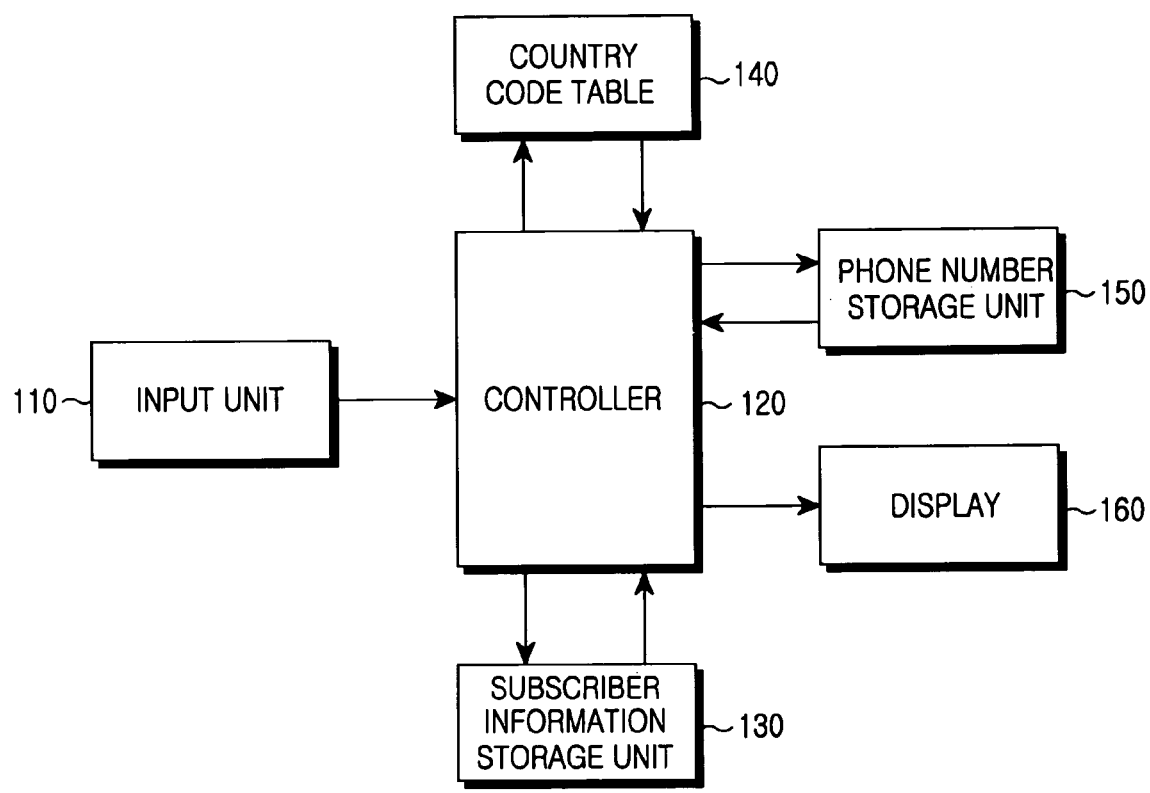
FIG. 2 is a view illustrating a schematic diagram of a mobile terminal in accordance with a preferred embodiment of the present invention.

FIG. 2 is a view illustrating a schematic diagram of a mobile terminal in accordance with a preferred embodiment of the present invention. Referring to FIG. 2, the mobile terminal according to the present invention includes an input unit 110, a controller 120, a subscriber information storage unit 130, a country code table 140, a phone number storage unit 150, and a display 160.

The input unit 110 is adapted to execute an interface between a user and his or her mobile terminal. For example, a representative example of such an input unit 110 is a keypad. The display 160 displays operation status and an external entry item thereon. The input unit 110 and the display 160 are adapted to execute an interface between the mobile terminal and the user, and are typically contained in a general mobile terminal along with a speaker and a microphone (not shown), so their detailed description will hereinafter be omitted.

The country code table 140 stores and manages country code information of various countries for allowing a mutual international roaming process. An exemplary structure for storing a country code in the country code table 140 is depicted in FIG. 3. Referring to FIG. 3, the country code table 140 couples each mobile communication network ID with a country code of a prescribed country where the mobile communication network is located, and individually stores and manages a plurality of couples of the network IDs and the country code, in which the mobile communication network IDs are received from a plurality of MSCs for providing a mobile communication network service for every service area.

The mobile communication network ID is specific information transmitted to a mobile terminal from a MSC providing a mobile communication network service for every service area. Such a mobile communication network ID includes an MCC (Mobile Country Code), an MNC (Mobile Network Code), an LAI (Location Area Identity), and a PLMN enterpriser ID.

The subscriber information storage unit 130 stores and manages a mobile service subscriber's registration information and mobile service usage history information. The mobile service subscriber's registration information is information stored in a mobile terminal when the mobile service subscriber joins a prescribed mobile communication service as a member. A representative example of such mobile communication service subscriber's registration information is a MCC (hereinafter referred to as an H_MCC) of a PLMN (i.e., Home PLMN). The mobile service usage history information is a subscriber's usage record information, stored from the time of a subscriber's mobile service registration up to the time of the subscriber's most recent usage, and is typically stored in a mobile terminal. A representative example of mobile service usage history information is a MCC (hereinafter referred to as an R_MCC) of a PLMN (i.e., registered PLMN) indicating the most recent usage record of a mobile terminal.

The phone number storage unit 150 stores and manages phone number information entered by a user. An exemplary structure for storing/managing phone numbers in the phone number storage unit 150 is shown in FIG. 4. Referring to FIG. 4, the phone number storage unit 150 includes a reception information storage field (e.g., a receiver name), a country code storage field, and a phone number storage field. The phone number storage unit 150 divides a phone number into a country code and a common phone number excluding country code, and stores the phone number divided into the country code and the common phone number, as shown in FIG. 4.

The controller 120 controls an operation of the mobile terminal according to an external control command. Particularly, the controller 120 automatically generates a country code of a country in which the mobile terminal is located using the mobile service subscriber's registration information and the mobile service usage history information stored in the subscriber information storage unit 130. The controller 120 adapts the country code to execute a new phone number storage command or a prestored phone number search command.

Figure 5:
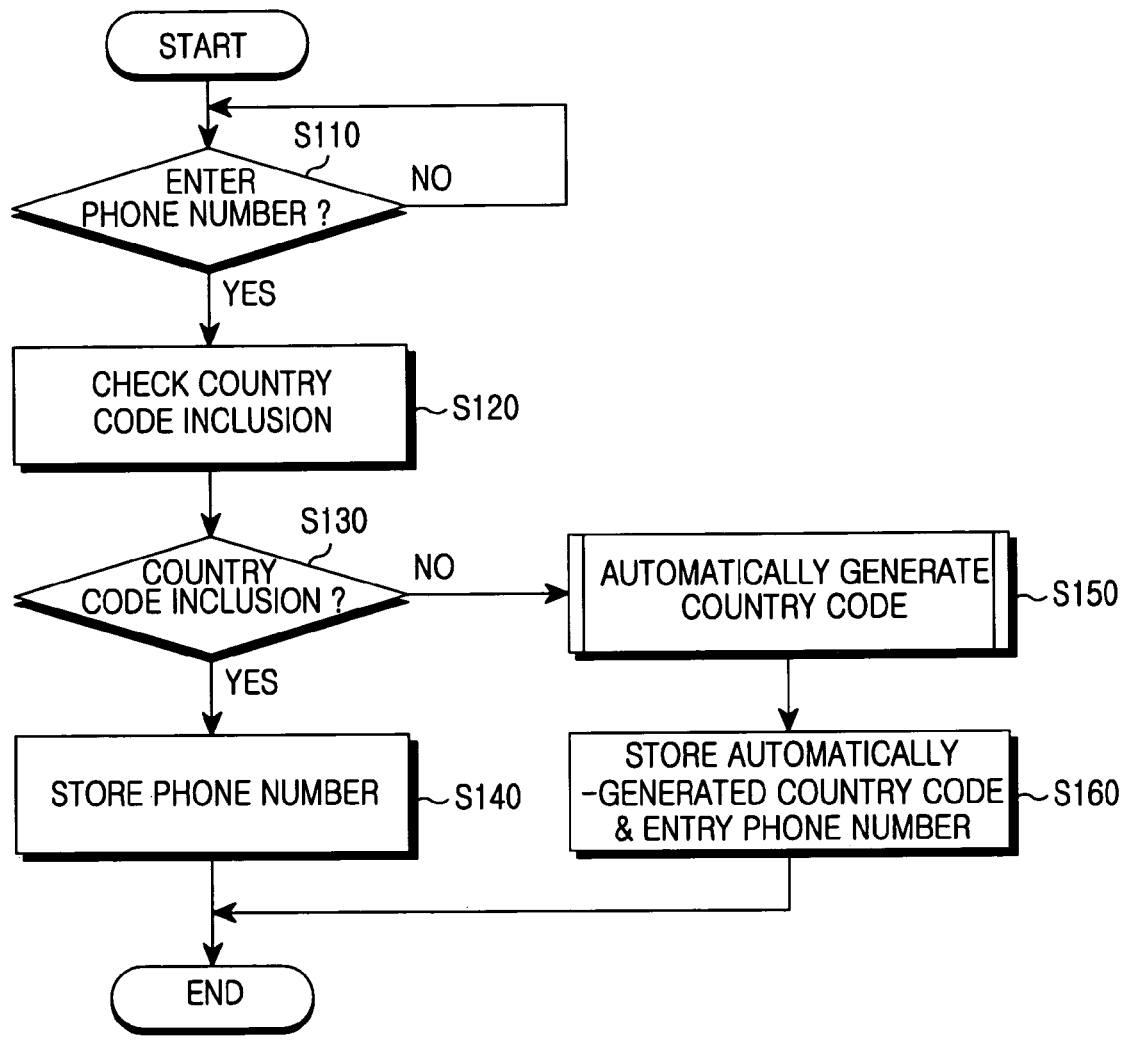
FIG. 5 is a flow chart illustrating a procedure for storing a phone number in accordance with a preferred embodiment of the present invention.
Figure 6:
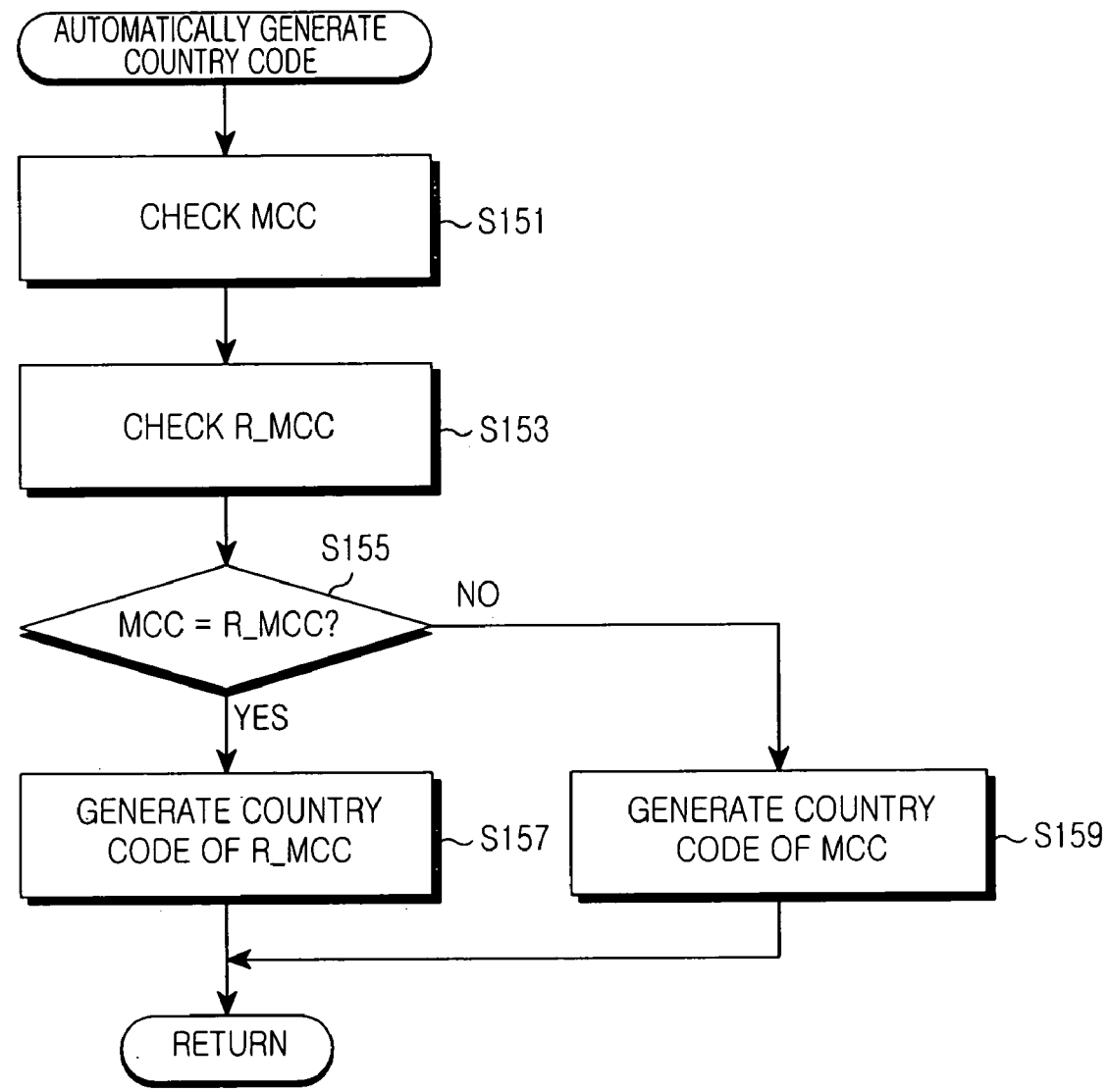
FIG. 6 is a flow chart illustrating a procedure for automatically generating a country code in accordance with a preferred embodiment of the present invention.
Figure 7:
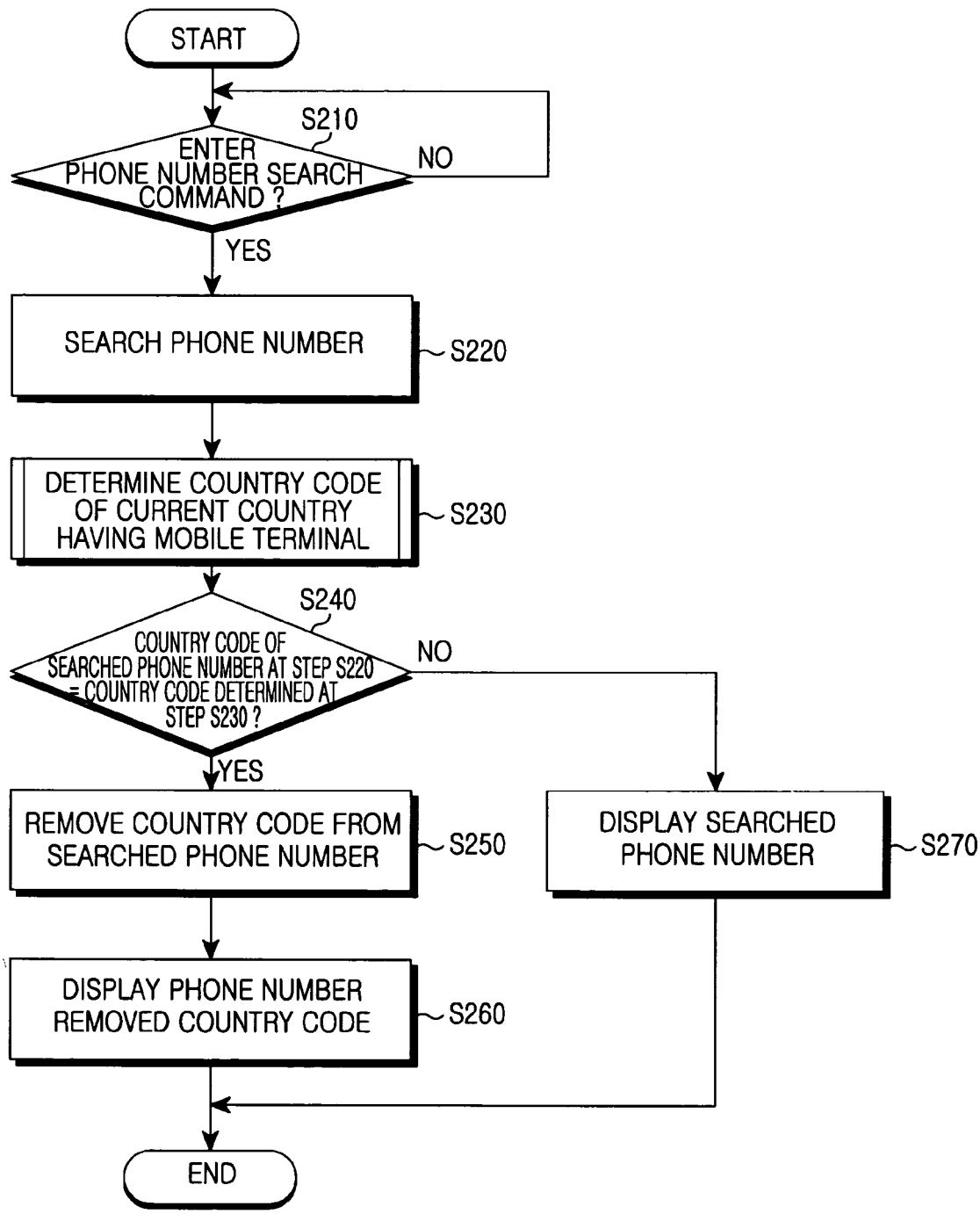
FIG. 7 is a flow chart illustrating a procedure for finding a phone number in accordance with a preferred embodiment of the present invention

A method for automatically generating a country code, a method for storing a phone number using the country code, and a method for finding a phone number using the country code are shown in FIGS. 5–7, respectively.

FIG. 5 is a flow chart illustrating a procedure for storing a phone number in accordance with a preferred embodiment of the present invention. Referring to FIGS. 2 and 5, if a user selects a command for storing a phone number on the input unit 110 and enters a desired phone number at step S110, the controller 120 reads the entry phone number and determines at step S120 whether the entry phone number has a country code. The controller 120 determines whether a specific code or specific number arrangement is contained in the entry phone number at step S120. For example, the controller determines whether specific information of '00' or '+' is contained in the phone number entered by the input unit 110, because a general country code begins with the specific information of '00' or '+' as shown in '0044' or '+44'.

The controller 120 determines at step S130 whether a country code of a country in which the mobile terminal is located is automatically generated on the basis of the result of step S120. If it is determined at step S120 that the entry phone number has no country code, the controller 120 automatically generates a country code using a mobile communication network ID of a current PLMN service at step S150, and stores the automatically generated country code and the entry phone number in the phone number storage unit 150 at step S160. If it is determined at step S120 that the entry phone number has a country code, the controller 120 stores the entry phone number in the phone number storage unit 150 at step S140. The controller 120 separately stores in the phone number storage unit 150 the country code received from the input unit 110 or automatically generated at step S150, and a phone number excluding the country code. The controller 120 stores the country code in a country code field of the phone number storage unit 150, and the phone number excluding the country code in a phone number field of the phone number storage unit 150.

Herein, please note that FIG. 6 illustrates the procedure of step S150 of FIG. 5 in detail. FIG. 6 is a flow chart illustrating a procedure for automatically generating a country code in accordance with a preferred embodiment of the present invention. Referring to FIGS. 2 and 6, if the controller 120 decides to automatically generate a country code, it checks a mobile communication network ID (i.e., MCC) of a current PLMN service at step S151, and checks another ID (i.e., R_MCC) of the most recent use of the mobile communication network by the mobile terminal, using a mobile service usage history information previously stored in the subscriber information storage unit 130 at step S153, to determine whether a roaming service is executed. The controller 120 determines at step S155 whether the mobile communication network ID (MCC) of step S151 is identical to the other ID (R_MCC) of step S153. Based on the determination result, the controller 120 retrieves a country code corresponding to either the MCC or the R_MCC from the prestored country code table, and generates a correct country code at step S157 or S159. If it is determined at step S155 that the mobile communication network ID (MCC) is identical to the other ID (R_MCC), the controller 120 determines that a roaming service is not executed and retrieves a country code corresponding to the ID (R_MCC) confirmed at step S153 from the country code table 140. If it is determined at step S155 that mobile communication network ID (MCC) is not identical to the other, ID (R_MCC), the controller 120 determines that a roaming service is executed and retrieves a country code corresponding to the ID (MCC) confirmed at step S151 from the country code table 140. The controller 120 then automatically allocates the retrieved country code as a country code of a country in which the mobile terminal is located.

For instance, in the case where any mobile service subscriber enters a phone number shown in the following Table 1 in an area using a country code of '0044', and attempts to store the entry phone number in a mobile terminal carried with the subscriber, the result of storing the entry phone number in the mobile terminal on the basis of the methods shown in FIGS. 5–6 is shown in the following Table 2:

TABLE 1

| Name | Phone Number |
| --- | --- |
| Father | 0208775331 |
| Mother | 0208786998 |
| Boss | 07787816714 |
| American_uncle | 001-778835991 |

TABLE 2

| Name | Country Code | Phone Number |
| --- | --- | --- |
| Father | 0044 | 0208775331 |
| Mother | 0044 | 0208786998 |
| Boss | 0044 | 07787816714 |
| American_uncle | 001 | 0778835991 |

With reference to the above Tables 1~2, in the case of 'American_uncle', wherein a user manually enters a country code, the mobile terminal stores a country code and phone number entered by the user. In the cases of 'Father', 'Mother', and 'Boss', wherein a user does not enter a country code, it can be seen that a country code of '0044' of a country (or area) where the user is located is automatically appended on the front of each phone number.

FIG. 7 is a flow chart illustrating a procedure for finding a phone number in accordance with a preferred embodiment of the present invention. Referring to FIGS. 2 and 7, if a user selects a command for finding a phone number on the input unit 110 and enters desired search information at step S210, the controller 120 searches through the phone number storage unit 150, and retrieves a corresponding phone number from the phone number storage unit 150 at step S220.

The controller 120 determines a country code of a country where a mobile terminal is located at step S230, being a country where the user of the mobile terminal is located. The controller 120 determines at step S240 whether the country code determined at step S230 is identical to the other country code contained in the phone number found at step S220. Based on the result of comparing the two country codes at step S240, the controller 120 controls the display 150 to display a found phone number in a prescribed display format at steps S250–270. If it is determined at step S240 that the country code determined at step S230 is identical to the other country code contained in the phone number found at step S220, the controller 120 removes the country code from the found phone number at step S250, and controls the display 160 to display a phone number excluding country code at step S260. On the other hand, if it is determined at step S240 that the country code determined at step S230 is not identical to the other country code contained in the phone number found at step S220, the controller 120 controls the display 160 to display the found phone number at step S270. In this case, the result may be displayed in a display format preset by the user. For example, in the case where the found phone number is composed of a country code, a regional number, and a common phone number excluding both the country code and the regional number, the country code, the regional number, and the common phone number excluding both the country code and the regional number are distinguishably displayed according to a user-defined display format. For example, a specific sign such as '-' may be inserted between the country code, the regional number, and the common phone number according to the user-defined display format, or may be added only to the rear of the country code. Such a display format may be applicable in various ways according to the type of user-defined information.

For example, in the case where a phone number is stored in the phone number storage unit 150 in the form of the above Table 2 and a user enters a command for finding a phone number of 'Father' in a certain area having a country code of '0044', the result of finding the phone number of 'Father' in the phone number storage unit 150 on the basis of the methods shown in FIGS. 5–7 is displayed in a format (i.e., 0208775331) excluding the country code of '0044'. Such a display format may be applicable in various ways according to the type of user-defined information.

In another example, in the case where a phone number is stored in the phone number storage unit 150 in the form of the above Table 2 and a user enters a command for finding a phone number of 'Father' in a place other than the area having the country code of '0044', the result of finding the phone number of 'Father' in the phone number storage unit 150 on the basis of the method shown in FIG. 7 is displayed in the a format (i.e., 0044-0208775331) including the country code of '0044'. Such a display format may be applicable in various ways according to the type of user-defined information.

As apparent from the above description, in the case where an international roaming service is executed by a user's moving from one country to another country, a mobile terminal automatically generates a country code without appending a country code to the mobile terminal to make a phone call to a called party, or stores an arbitrary phone number in the mobile terminal. Thus, the present invention automatically processes a country code in a mobile terminal when executing an international roaming service between countries, such that there is no need for mobile service users to manually enter a country code in their mobile terminal when they move from one country to another country, thereby increasing users' convenience.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. The present invention has been disclosed on a GSM system, however, it can also be applicable, for example, to a wideband CDMA system which uses a chipset for supporting GSM and CDMA schemes as well as a protocol for supporting the same.

What is claimed is:

1. A mobile terminal for providing mobile service subscribers with a mobile service, comprising:
    a country code storage unit for coupling each mobile communication network ID received from each of a plurality of mobile communication network MSCs (Mobile Switching Centers) providing a mobile communication network service for every service area with a country code of a prescribed country in which the mobile communication network is located, and for storing and managing the coupling result of the mobile communication network ID and the country code;
    a subscriber information storage unit for storing and managing mobile service registration information and mobile service usage history information of the mobile service subscriber;
    a phone number storage unit for storing and managing phone number information; and
    a controller for detecting a mobile communication network ID of a current PLMN (Public Land Mobile Network) service, retrieving mobile service usage history information from the subscriber information storage unit upon receiving either a phone number storage command or a phone number search command, determining whether a roaming operation of the mobile terminal is executed on the basis of the mobile communication network ID of the current PLMN service and the mobile service usage history information, and executing a phone number storage command or a phone number search command using both a received entry phone number and a detected country code.

2. The mobile terminal as set forth in claim 1, wherein the phone number storage unit includes a phone number storage field, a phone number storage field excluding country code, and a reception information storage field of the phone number excluding country code.

3. The mobile terminal as set forth in claim 1, wherein the controller analyzes an entry phone number received for a phone number storage service, determines whether the entry phone number has a country code, retrieves a country code of a country where the mobile terminal is located from the country code storage unit in the case where the entry phone number has no country code, and stores the country code and the entry phone number in the phone number storage unit.

4. The mobile terminal as set forth in claim 1, wherein the controller reads a requested phone number from the phone number storage unit, detects a country code of a country where the mobile terminal is located according to the phone number search command, compares the detected country code with an other country code associated with a phone number read from the phone number storage unit, and then displays a phone number having the other country code inserted into the phone number on a display in a predetermined display format when the detected country code is different from the other country code.

5. The mobile terminal as set forth in claim 4, wherein the controller, if the detected country code is identical to the other country code read from the phone number storage unit, displays on the display a phone number created by removing the country code from the phone number read from the phone number storage unit in a predetermined display format.

6. A method for finding a phone number in a mobile terminal adapted to store and manage country code information of various countries to allow a mutual roaming process among countries, mobile service registration information and mobile service usage history information of the mobile service subscriber comprising the steps of:

a) reading a search-requested phone number from a memory contained in the mobile terminal upon receiving a phone number search command;

b) detecting a country code of a current country wherein the mobile terminal is located;

c) comparing a country code contained in the phone number read at step (a) with the country code detected at step (b); and d) displaying the phone number read at step (a) in the form of a prescribed display format on the basis of the result of step (c), wherein if it is determined at step (c) that the country code detected at step (b) is different from the country code contained in the phone number read at step (a), displaying in step (d) a phone number having the country code contained in the phone number read at step (a), and if it is determined at step (c) that the country code detected at step (b) is the same as the country code contained in the phone number read at step (a), displaying in step (d) a phone number created by removing the country code from the read phone number of step (a).

* * * * *